June 8, 1937.   J. C. STEINER   2,083,103
WEED CUTTING DEVICE
Filed Sept. 12, 1934
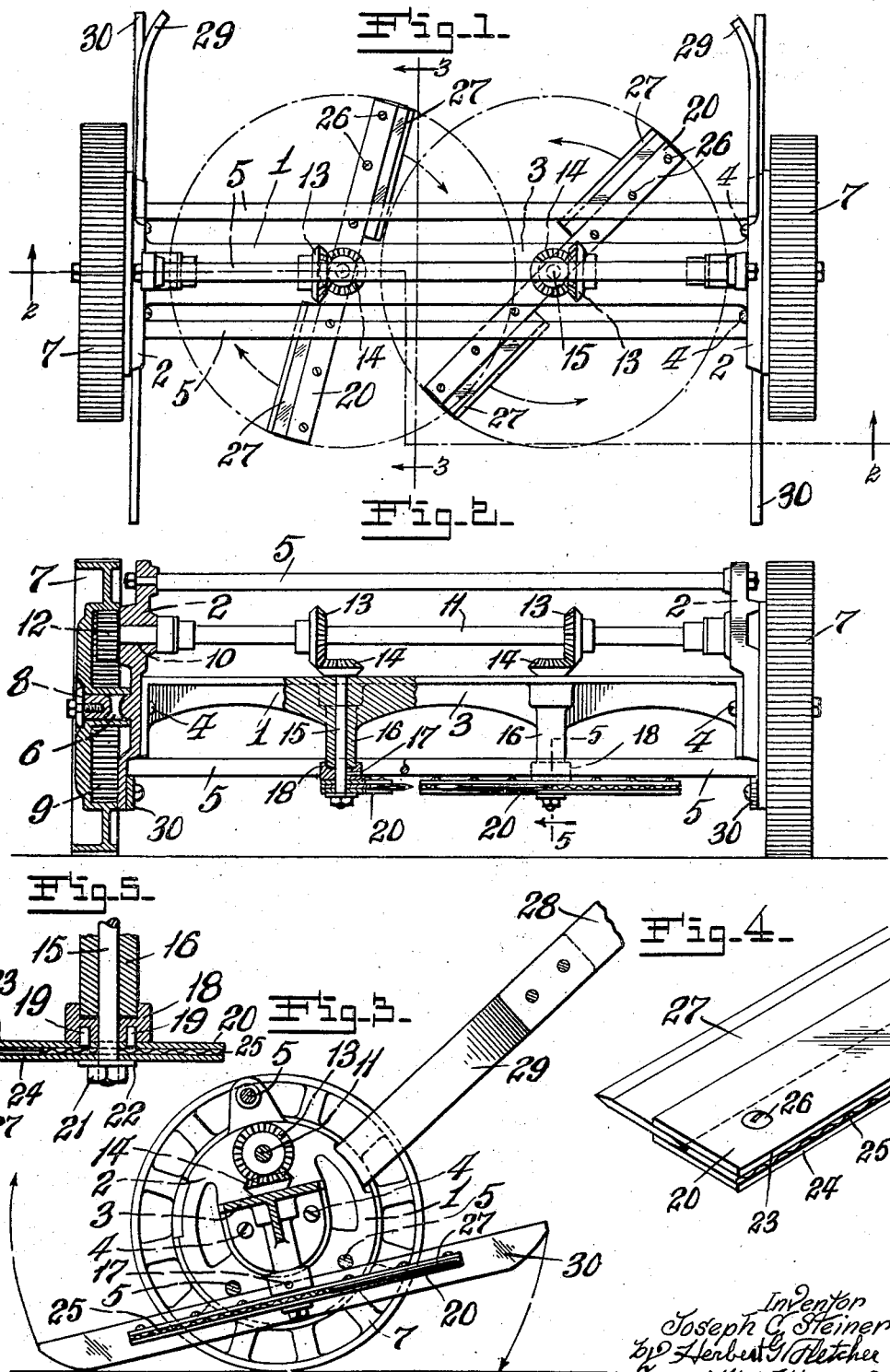

Patented June 8, 1937

2,083,103

UNITED STATES PATENT OFFICE 2,083,103

WEED CUTTING DEVICE

Joseph C. Steiner, St. Louis, Mo.

Application September 12, 1934, Serial No. 743,678

7 Claims. (Cl. 56—255)

This invention relates to improvements in a weed cutting device and has for its primary object, the purpose of providing the device with improved means whereby the cutting operation on the weeds or other tall growth will be effected, while the weed growth remains upstanding.

Another object of the invention is in providing the weed cutting device with horizontally inclined rotary cutters which are traveled adjacent the earth's surface.

A further object of the invention is in providing the weed cutting device with horizontally rotatable cutters and with means for guarding the cutters against engaging the earth or ground surface during rotation.

A still further object of the invention is in providing the device with improved means for mounting the cutting blades.

Other and further objects will appear in the specification and be specifically pointed out in the appended claims, reference being had to the accompanying drawing, exemplifying the invention, and in which:—

Figure 1 is a plan view of this improved weed cutting device with the supporting arms for the propelling handle broken away.

Figure 2 is a longitudinal view partly in section, taken approximately on the line 2—2 of Fig. 1.

Figure 3 is a transverse section taken approximately on the line 3—3 of Fig. 1.

Figure 4 is an enlarged fragmentary perspective view of a cutting blade and its securing means.

Figure 5 is an enlarged fragmentary vertical section taken approximately on the line 5—5 of Fig. 2.

Referring by numerals to the accompanying drawing, 1 designates a frame which comprises end members 2, a longitudinal member 3 which is secured at its ends to the end members 2 by the screws 4 and a plurality of stay rods 5, said stay rods being secured at their ends to the end members 2.

Extending laterally from each end member 2 is a spindle 6, said spindles being in horizontal alinement, and rotatively mounted on each spindle is a traction wheel 7. Each traction wheel 7 is held on its respective spindle by a screw-held washer 8, and provided on each traction wheel is an internal set of gear teeth 9.

Formed in each end member 2 of the frame 1 is a bearing 10, said bearings being in horizontal alinement and are for the support of a drive shaft 11, and fixedly secured on each end of the shaft adjacent respective bearings 10, is a pinion 12, each pinion being in mesh with the internal teeth 9 of a respective traction wheel 7.

Fixedly secured on the shaft 11 intermediate of its length, are a pair of bevel gears 13 and in mesh with each gear 13 is a bevel gear 14, each bevel gear 14 being fixedly secured to respective vertical shafts 15, which are mounted in respective bearings 16 which are extended from the longitudinal member 3.

Each shaft 15 extends beyond the lower end of its respective bearing 16 and fixed to each shaft by a pin 17, is a collar 18 and extended from the underside of each collar is a pair of pins 19 which are engaged in matching openings formed in respective cutting blade holders 20, one of which is mounted on the lower end of each shaft 15 and is secured thereon by a nut 21 and a washer 22 clamped thereagainst.

Each cutting blade holder 20 comprises a pair of relatively long clamping jaws 23 and 24 which are held in spaced relation by longitudinally interposed corrugated resilient metallic packing strips 25, of which there are a pair. Each packing strip extends approximately from the shaft 15 on opposite sides thereof to respective extending ends of the clamping jaws, the packing strip on one side of the shaft being located between the jaws on one side thereof and the packing strip on the other side of the shaft being located between the jaws on the other side thereof.

The packing strips 25 are approximately two-thirds of the width of the clamping jaws, and as they are disposed sidewise thereof, provision is made for the longitudinal disposal of a double-edged cutting blade 27, between the clamping jaws 23 and 24 of each blade holder 20 on each side of a respective shaft 15, and forwardly of a respective packing strip 25, said blades being secured between the jaws, each with a cutting edge extending therefrom, by clamping screws 26 which pass through the jaws 23 and 24 and the packing strips 25, and are in threaded engagement with the jaw 24 of each blade holder.

During mounting the blades 27, of which there are two in each blade holder 20, the screws 26 when loosened, obviously will permit separating of the jaws 23 and 24 by the corrugated resilient packing strips 25 therebetween. When the blades 27 are mounted between the jaws in the manner as shown in Fig. 4, and the screws 26 are tightened for drawing the jaws 23 and 24 together for clamping the blades therebetween, the packing strips 25 will yield an amount approximately corresponding to the drawn together distance of the jaws. After the blades 27 have been clamped in the blade holders 20 and during operation of the weed cutting device, the resilience of the packing strips 25 will tend to continue the clamping strain of the jaws 23 and 24 on the blades by reason of their expanding resiliency, thus preventing the blades from becoming loosened.

The frame 1 of the weed cutting device is provided with a propelling handle 28 which is secured between a pair of arms 29, connected to a respective end wall 2 of the frame. Secured to each end member 2 in a horizontally inclined position is a guard member 30, said members extending equal distances forwardly and rearwardly of the traction wheels 7 and are adapted to engage the ground surface at their extending ends, when the cutting device is tilted forwardly or rearwardly for preventing engagement of the blade holders 20 and the blades carried thereby, with the ground surface.

In the operation of the cutting device, as it is propelled over the ground, the traction wheels 7 upon turning, will cause the shaft 11 to rotate by reason of its geared connection with the internal gearing on respective wheels 7, and the bevel gears 13 will transmit rotary motion to the bevel gears 14 and the vertical shafts 15 carrying the respective blade holders 20 will be revolved, thus rotating the blade holders and the blades 27 carried thereby, the exposed cutting edges of the blades striking the weeds or tall growth a short distance above the ground and cutting them off before the cutting device is traveled thereover, the device at no time bending or knocking the weeds over, before they are cut off by the cutting blades.

The meshing pairs of beveled gears 13 and 14 are disposed so as to rotate the respective shafts 15, in opposite directions, and the distance in which said shafts are positioned from one another is such wherein the rotating arcs of the blade holders 20, will overlap so that the cutting operation of the blades on the weeds will completely embrace the entire cutting range of the blades.

With the use of the double-edged blades 27, the blades can be reversed in their clamped positions in the holders 20 by manipulating the clamping screws 26 and the clamping jaws 23 and 24 for releasing said jaws and for re-setting said jaws to clamping positions on the blades.

While a preferred embodiment of the invention is shown, it is to be understood that various changes, size, shape and arrangements of parts, may be resorted to without departing from the spirit and scope of the invention of the claims hereto.

What I claim is:—

1. A weed cutting device comprising a frame, traction wheels having gear teeth supported from the frame, a shaft supported by said frame having end disposed gears in mesh with the gear teeth of respective traction wheels, horizontally rotatable cutters disposed beneath the frame, having geared connection with said shaft, and a guard member secured to the frame having forwardly and rearwardly extending ends for protecting the cutters from ground engagement.

2. A weed cutting device having a tiltable frame, traction wheels supported from the frame, a pair of horizontally rotatable cutters depended from the frame, having operable connection with the traction wheels, and a horizontally inclining guard member secured to the frame having forwardly and rearwardly extending ends for protecting the cutters from ground engagement.

3. A weed cutting device comprising a frame, traction wheels having gear teeth supported from the frame, a shaft supported by said frame having end disposed gears in mesh with the gear teeth of respective traction wheels, a pair of shafts disposed at right angles to said first mentioned shaft and having geared connection therewith, a blade holder mounted on each shaft of said pair of shafts, and a collar rigidly fixed to each shaft of said pair of shafts, each having a projecting pin in engagement with a respective blade holder for keying each blade holder to a respective shaft.

4. A weed cutting device having a frame, traction wheels supported from the frame, a horizontally rotatable cutting blade holder depended from the frame, having operable connection with the traction wheels, said holder comprising a pair of opposed clamping jaws, a corrugated resilient packing strip interposed between said jaws adjacent the side edges on one side thereof, a cutting blade interposed between said jaws adjacent the other side edges thereof, and clamping means for said jaws.

5. A weed cutting device comprising end members, a spindle extended from each end member, a traction wheel having gear teeth and supported on each spindle, a supporting member connected at its ends to respective end members, a horizontal shaft supported by said end members and having end disposed gears in mesh with the teeth of respective traction wheels, a pair of spaced vertical shafts mounted in said supporting member and having geared connection with said horizontal shaft, a horizontally disposed cutter fixedly secured to the depending end of each vertical shaft, and a guard member secured to each end member having forwardly and rearwardly extending ends for protecting the cutters from ground engagement.

6. A weed cutting device comprising end members, a spindle extended from each end member, a traction wheel having gear teeth and supported on each spindle, a supporting member connected at its ends to respective end members, a horizontal shaft supported by said end members and having end disposed gears in mesh with the teeth of respective traction wheels, a pair of spaced vertical shafts mounted in said supporting member and having geared connection with said horizontal shaft, and a horizontally rotatable cutter fixedly secured to the depending end of each vertical shaft and disposed in the same plane beneath said supporting member, each cutter comprising a pair of diametrically disposed cutting edges.

7. A blade holder for a cutting device comprising a shaft, a collar rigidly fixed on said shaft, a pair of opposed clamping jaws centrally disposed on said shaft at a right angle thereto, cutting blades secured between said jaws, means on said shaft for clamping the jaws against said collar, and a key pin cooperably engaging said collar and one of said jaws for preventing rotation of said jaws on said shaft.

JOSEPH C. STEINER.